United States Patent
Pasca

(10) Patent No.: US 9,632,311 B2
(45) Date of Patent: Apr. 25, 2017

(54) HEAD-UP DISPLAY SYSTEM AND HEAD-UP DISPLAY

(71) Applicant: Andrei Pasca, Timisoara (RO)

(72) Inventor: Andrei Pasca, Timisoara (RO)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 14/513,927

(22) Filed: Oct. 14, 2014

(65) Prior Publication Data

US 2015/0102980 A1  Apr. 16, 2015

(30) Foreign Application Priority Data

Oct. 16, 2013 (EP) ..................................... 13464016

(51) Int. Cl.
*G02B 27/01* (2006.01)

(52) U.S. Cl.
CPC ......... *G02B 27/0101* (2013.01); *G02B 27/01* (2013.01); *G02B 2027/011* (2013.01); *G02B 2027/013* (2013.01); *G02B 2027/0112* (2013.01)

(58) Field of Classification Search
CPC  G02B 27/0101; G02B 6/0028; G02B 6/0068; G02B 27/01; G02B 2027/011; G02B 2027/0112; G02B 2027/013; G02F 2001/133616
See application file for complete search history.

(56) References Cited

U.S. PATENT DOCUMENTS

| | | | | |
|---|---|---|---|---|
| 5,053,755 A | * | 10/1991 | Smith | G02B 27/0018 340/980 |
| 2008/0231953 A1 | * | 9/2008 | Young | G02B 27/286 359/489.08 |
| 2008/0272379 A1 | * | 11/2008 | Laino | G02B 27/1026 257/88 |
| 2008/0285139 A1 | * | 11/2008 | Chen | G02B 27/0101 359/630 |
| 2009/0141363 A1 | * | 6/2009 | Shin | G02B 27/0101 359/630 |
| 2010/0225833 A1 | * | 9/2010 | Methe | G02B 27/0101 349/11 |
| 2011/0074808 A1 | * | 3/2011 | Huang | G09G 5/02 345/590 |
| 2011/0242668 A1 | * | 10/2011 | Potakowskyj | G02B 27/0149 359/630 |

(Continued)

FOREIGN PATENT DOCUMENTS

| | | |
|---|---|---|
| WO | WO 2007/138576 | 12/2007 |
| WO | WO 2010/125367 | 11/2010 |

*Primary Examiner* — Lun-Yi Lao
*Assistant Examiner* — Elliott Deaderick
(74) *Attorney, Agent, or Firm* — Cozen O'Connor

(57) ABSTRACT

A head-up display system for display on a windowpane includes: an image-generating display device configured to generate an image; and an optical system configured to deflect the generated image onto the windowpane. The image-generating display device is an electronic paper display device, the electronic paper display device including a curved image-generating surface having a curvature, the curvature of the image-generating surface being adjustable to adjust the curvature of the image-generating surface so as to compensate for image distortion occurring due to a curvature of the windowpane.

5 Claims, 6 Drawing Sheets

(56) References Cited

U.S. PATENT DOCUMENTS

| | | | | |
|---|---|---|---|---|
| 2013/0021224 A1* | 1/2013 | Fujikawa | ............ | G02B 27/0101 |
| | | | | 345/7 |
| 2013/0120678 A1* | 5/2013 | Chao | ........................ | F21K 9/50 |
| | | | | 349/34 |
| 2013/0182197 A1* | 7/2013 | Ludewig | ............ | G02B 27/0101 |
| | | | | 349/11 |
| 2013/0207946 A1* | 8/2013 | Kim | ..................... | G09G 3/3225 |
| | | | | 345/204 |
| 2013/0265262 A1* | 10/2013 | Jung | ....................... | G06F 3/041 |
| | | | | 345/173 |

* cited by examiner

HEAD-UP DISPLAY SYSTEM AND HEAD-UP DISPLAY

BACKGROUND OF THE INVENTION

1. Field of the Invention

The present application relates to a head-up display system and a head-up display.

2. Description of the Related Art

In vehicles such as, for example, a motor vehicle or in aircraft, head-up displays are used which make additional information, for example the current speed or status displays, available to the viewer in his surrounding field of vision.

For such head-up displays it is possible to use, for example, active liquid crystal displays whose image is projected onto a windowpane, for example the front windshield of a motor vehicle. To produce an image that can be viewed well, it is necessary for the display to be significantly brighter than the ambient light, which requires comparatively high light intensities. Owing to the comparatively low transmission of such LCD displays, which is typically in the range of approximately 10%, the background lighting unit of the LCD display must light up comparatively brightly, which entails a high consumption of energy.

SUMMARY OF THE INVENTION

An object of the invention is to achieve an easily recognizable display in a head-up display with reduced consumption of energy.

This object may be achieved by a head-up display system that has an image-generating display device for generating an image and an optical system for deflecting the generated image onto a windowpane. The display device is designed according to an electronic paper display.

The term "electronic paper display (EPD)" includes all display devices suitable for displaying variable images and in which a static image remains for at least 50 ms, preferably for at least 1 s, without renewal of the image. In particular, the term includes display devices based on the functional principle of electrophoresis, electrowetting, control of micro-electromechanical elements, for example for micromechanically controlled interference modulation, or on bistable or at least quasi-bistable switchable states, for example in a bistable LCD display.

Whereas in a conventional active LCD display image renewal typically takes place every 10 to 20 ms, in the case of an electronic paper display a considerably reduced renewal rate, that is to say a reduced rate with which the individual electronically actuable pixels of the electronic paper display are actuated, is sufficient, at least for displaying static images. In particular, in the extreme case of a perfectly bistable display, no renewal is necessary for continuous display of a static image.

As a result, the consumption of energy of the head-up display system can be reduced. In addition, in the case of an image that is variable over time, only those areas in the display in which a change of the image to be displayed has occurred must be renewed. As a result, the dynamic power consumption of the actuation circuit can also be reduced.

It has become apparent that an electronic paper display is particularly suitable for use as an image-generating display device in a head-up display system.

For lighting the display device, the head-up display system preferably has a lighting source. The lighting of the display device therefore does not take place or at least takes place not only by the ambient light. For example, the lighting source comprises one or more light-emitting diodes. During operation of the head-up display system, the radiation generated by the lighting source can be reflected or transmitted by the display device. In other words, the display device is operated in the reflective or in the transmissive mode.

Electronic paper displays can be distinguished by a high level of reflectivity in the reflective operating mode and a high transmission level in the transmissive operating mode. The reflectivity or the transmission of the image-generating display device is preferably at least 30%, particularly preferably at least 40%. Compared to a back-lit standard LCD display, the light power emitted by the lighting source can therefore be reduced.

The image generated by the electronic paper display as a display device is non-polarized and therefore can be perceived by the viewer without being adversely affected, even if the viewer is wearing polarized sunglasses. In addition, the lack of polarizing elements brings about the high degree of reflection or transmission of the electronic paper display.

Furthermore, the displayed image of an electronic paper display is largely independent of the viewing angle and ensures a uniform contrast and uniform representation of colors over the entire displayed image.

Overall, the total consumption of energy by an electronic paper display can therefore be reduced compared to a conventional head-up display. The energy consumption is preferably at maximum 50%, particularly preferably at maximum 20% of the consumption of energy of a conventional head-up display.

In one preferred refinement, a colorimetric locus of the lighting source can be adjusted during operation of the head-up display system. For example, the lighting source has, in each case, a light source that emits in the red, green and blue spectral regions. In one embodiment variant, a synchronization unit for actuating the light sources is assigned to the lighting source. A full color image can be displayed with a single electronic paper display by synchronized superimposition of the radiation emitted by these light sources on a single electronic paper display.

In one alternative embodiment variant, the lighting source can also be embodied as a white light source, wherein the electronic paper display itself is configured for displaying a monochrome image or a color image.

In one preferred embodiment, an image-generating surface of the display device is curved. The image-generating surface is understood to be that surface of the display device at which the light for the image to be displayed is emitted during operation. Electronic paper displays can be manufactured in a simplified form on flexible carriers, with the result that the image-generating surface does not necessarily have to form a planar surface.

In particular, the image-generating surface of the display device can be curved in such a way that the image-generating surface at least partially compensates distortion of the image due to the windowpane of the head-up display, for example the windshield of a passenger car. Even in the case of a curved windowpane it is therefore easily possible to generate an image that is not distorted for the viewer.

The head-up display system can also be embodied in such a way that the curvature of the image-generating surface can be adjusted, for example during the initialization of the head-up display system.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features, refinements and expedient characteristics emerge from the following description of the exemplary embodiments in conjunction with the figures. In the drawings.

Identical elements, elements of the same type or identically acting elements are provided with the same reference symbols in the figures. The figures and the size ratios of the elements illustrated in the figures with respect to one another are not to be considered to scale. Instead, individual elements can be illustrated in an excessively large size for the sake of better illustration and/or for better comprehension.

DETAILED DESCRIPTION OF THE PRESENTLY PREFERRED EMBODIMENTS

Figure 1:
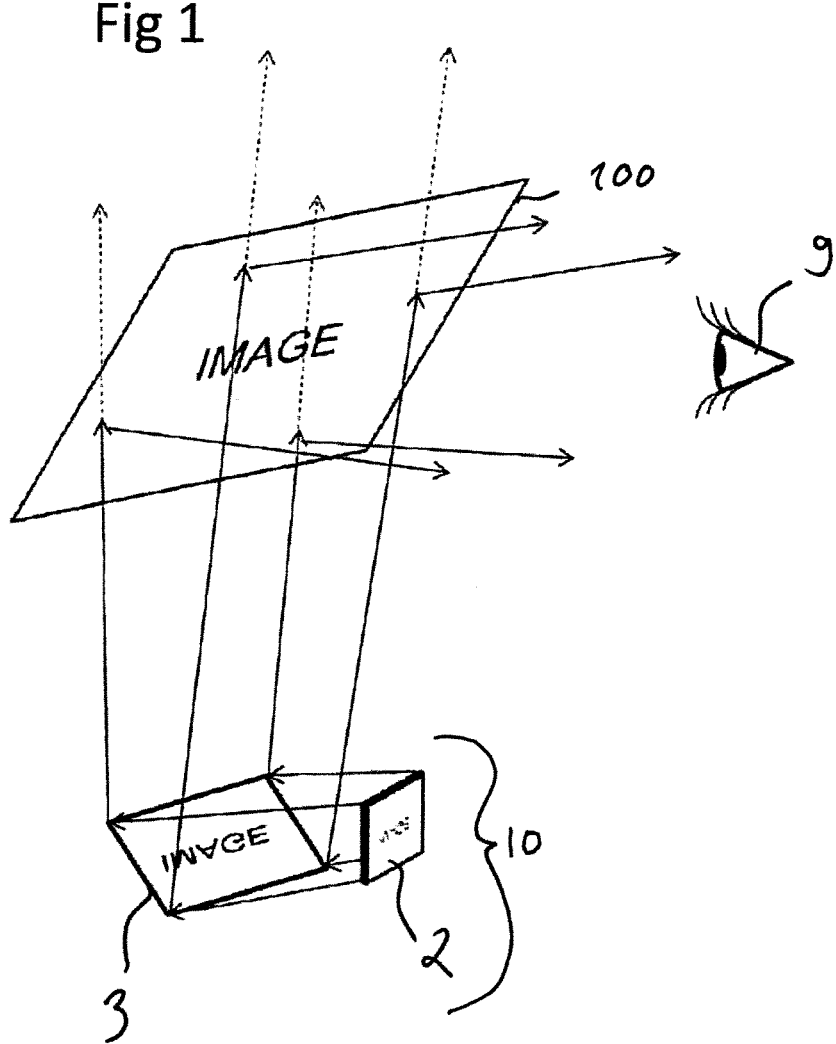
FIG. 1 shows a schematic illustration of a head-up display.

FIG. 1 illustrates an exemplary embodiment for a head-up display 1 in schematic form. The head-up display has a head-up display system 10 with an image-generating display device 2 and an optical system 3. During operation of the head-up display 1, the display device 2 generates an image that is directed, via the optical system 3, onto a windowpane 100, for example a windowpane of a cockpit in the aircraft or a windshield of a passenger car or of a motorbike. The displayed image is deflected at the windowpane toward a viewer 9, with the result that the viewer sees the surroundings through the windowpane and at the same time sees the image displayed by the display device. The image to be displayed is illustrated in the figures by the character sequence "IMAGE".

The display device 2 is embodied as an electronic paper display. For example, the electronic paper display is based on the functional principle of electrophoresis, electrowetting, the control of micro-electromechanical elements, for example for micromechanically controlled interference modulation or on bistable or at least quasi-bistable switchable states, for example in a bistable LCD display.

The display device 2 can be embodied in a matrix-like fashion or can be embodied segmented or as a combination of a matrix-like and a segmented configuration. The optical system 3 is shown as a single mirror merely for the sake of simplified illustration. The optical system can have one or more lenses and/or one or more planar or non-planar mirrors. The optical system is preferably embodied such that it transforms the light emitted by the display device 2 in such a way that the light generates for the viewer 9 a virtual image which is located several meters, in particular at least 2 m, for example between inclusively 2 m and inclusively 10 m, in front of the viewer. This simplifies the integration of the information displayed by the display device into the visual information of the real surroundings. The windowpane 100 can be a windowpane provided specifically for the head-up display in the viewing field of the viewer or can be a windshield or a windowpane of a cockpit itself. The optical path can be changed by a separate windowpane for the head-up display in such a way that the image generated by the display device can be deflected to the viewer and at the same time double reflections can be avoided.

Figure 2:
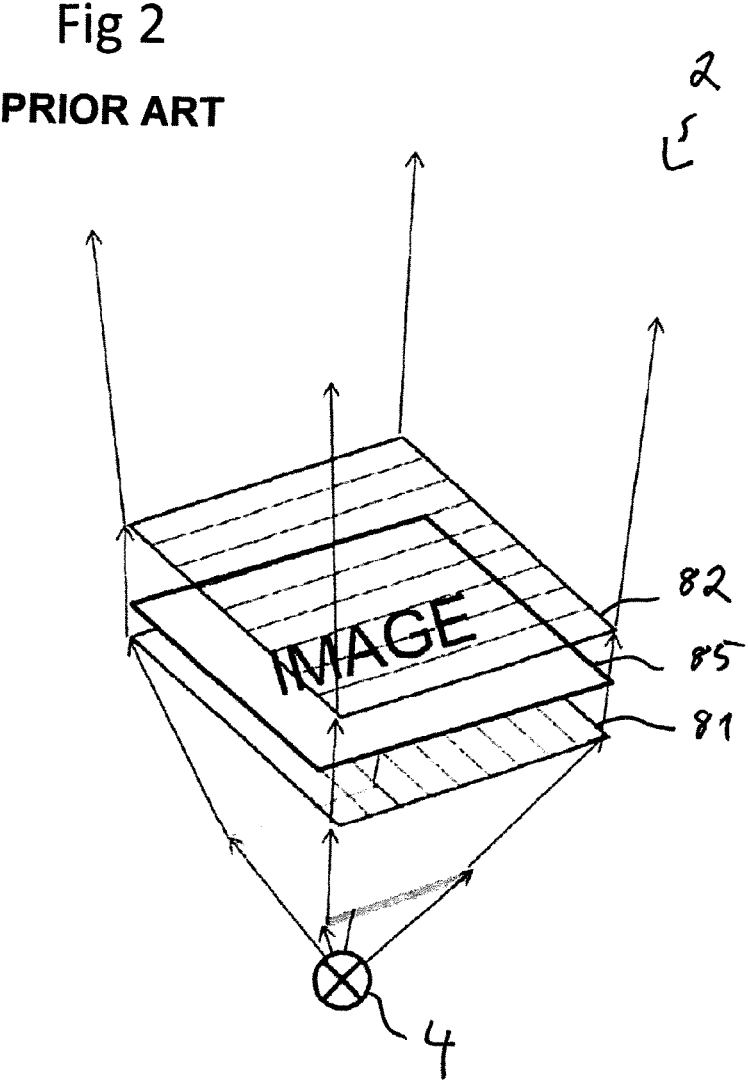
FIG. 2 shows an image-generating display device according to the prior art.

In contrast, typically back-lit LCD displays are used as a display device in conventional head-up displays (FIG. 2). In this context, an LCD display 85 is located between a first polarizer 81 and a second polarizer 82. The LCD display is illuminated by a lighting source 4 from the rear side. Owing to the crossed polarizers and the color filter for an RGB display the total transmission of such a display is typically approximately 10%. In addition, such a display is typically planar. This can lead to distortions of the displayed image in the case of a curved windowpane.

Figure 3:
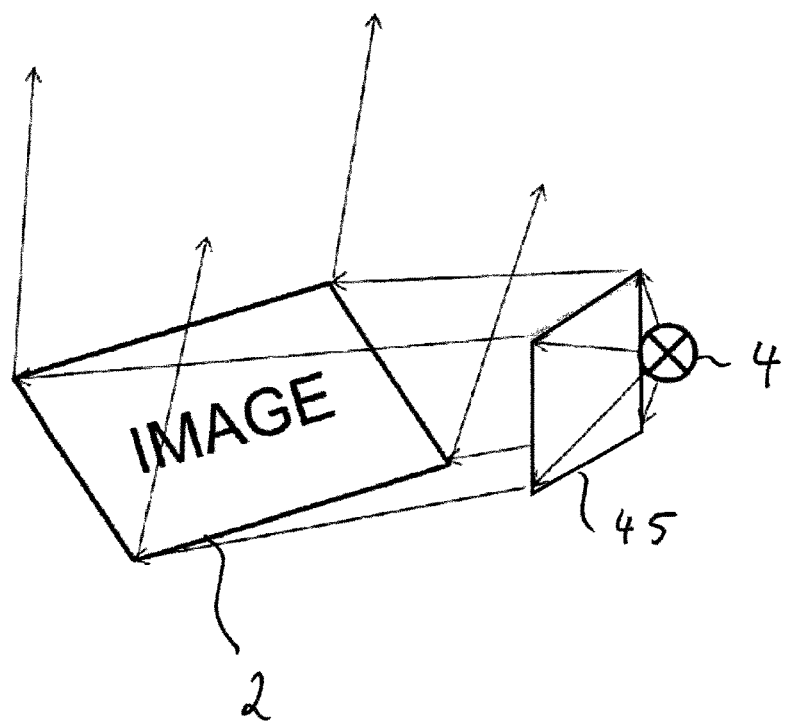
FIGS. 3 to 6 show exemplary embodiments for a head-up display system or for a head-up display in schematic illustrations.

In the exemplary embodiment illustrated in FIG. 3, the display device 2, which is embodied as an electronic paper display, is operated in the reflective mode. In order to generate the image to be displayed, the light generated by the lighting source 4 is therefore reflected by the display device 2. The reflectivity can be set for each pixel of the display device as a function of the image to be displayed. The lighting source can be, for example, a white light source, for example light-emitting diodes, which emit overall white light. The display device 2 can be embodied as a monochrome display device or can be designed to display a color image.

Before the light is incident, the light of the lighting source 4 passes through a homogenizer 45, in the simplest case a diffusor plate. However, further optical elements, for example lenses, can also be provided in order to make the illumination of the display device 2 as uniform as possible. Furthermore, for example films can be used to improve brightness (referred to as brightness enhancement films) or other films can be used. Such an element can be arranged upstream or downstream of the display device in the direction of emission. Of course, such elements can also be present on both sides of the display device. The reflectivity of the display device 2 is preferably at least 30%, particularly preferably at least 40%. The reflectivity is here the maximum reflectivity of a pixel of the display device. Owing to the high reflectivity, a comparatively small optical light power for the lighting source 4 compared to a conventional LCD display as the image-generating display device is sufficient to generate an image that can be recognized well by the viewer even in bright surroundings.

Figure 4:
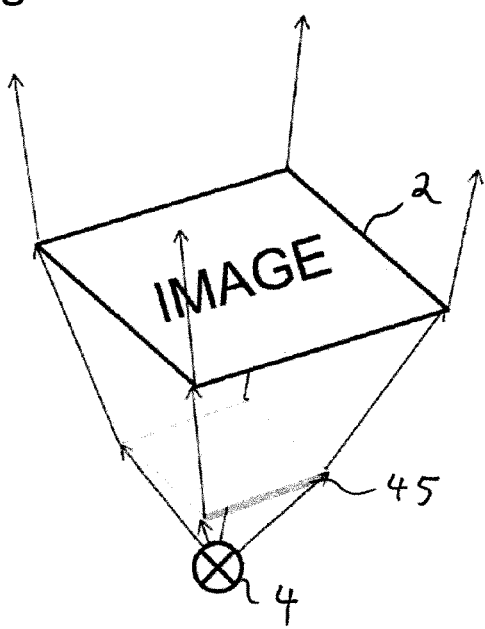

In contrast to the exemplary embodiment illustrated in FIG. 3, the image-generating display device 2 is operated in the transmissive mode in the exemplary embodiment illustrated in FIG. 4. The lighting source is therefore located on the rear side of the display device facing away from the optical system 3. The radiation which is made available by the lighting source is transmitted through the display device. The transmission, in particular the maximum transmission of a pixel, is preferably at least 30%, particularly preferably at least 40%.

Figure 5:
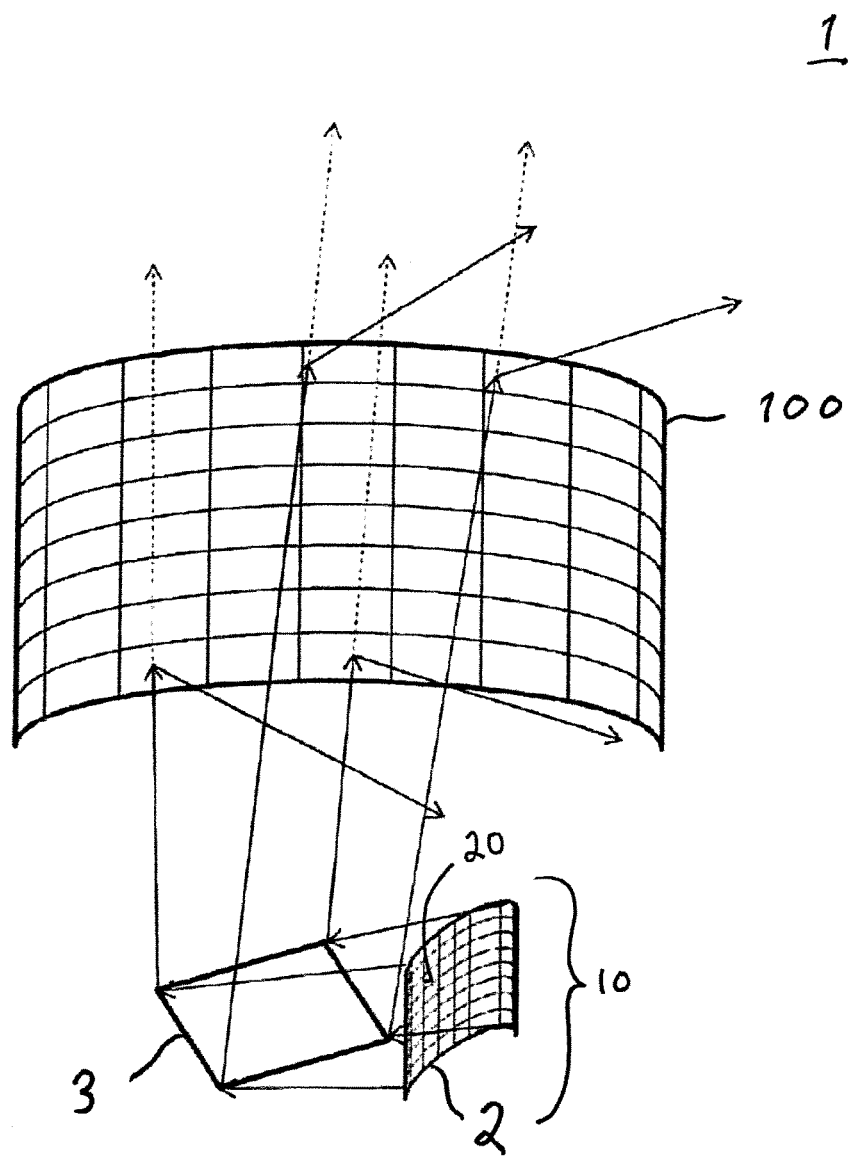

In the exemplary embodiment of the head-up display 1 illustrated in FIG. 5, an image-generating surface 20 of the display device 2 has a curvature. The display device is embodied, for example, on a flexible substrate. The curvature is embodied in such a way that distortions occurring due to a curvature of the windowpane 100 are at least partially compensated. The curvature can be predefined when the display device 2 is manufactured.

Alternatively, the display device 2 can be embodied in such a way that the curvature can be adjusted, for example by mechanical or electromechanical components. For example, the curvature can be adjusted during the initialization of the head-up display system or even during the normal operation.

It is therefore possible to dispense with a further compensation of the distortions. An additional compensation, for example by corresponding image processing, can optionally be performed in order, for example, to compensate second order effects. Of course, it is also possible for first order effects to be compensated alternatively or additionally to compensation by curvature of the display device.

By dispensing with digital processing of the image to be displayed in order to correct distortions it is possible to minimize the necessary computing power of the actuation unit and as a result the overall consumption of energy can be reduced further. In addition, the manufacturing costs can be reduced in this way.

By using an electronic paper display for the display device 2 it is possible to renew the image with a reduced rate, in particular when static images are displayed. In addition, only those areas of the image in which a change occurs have to be renewed. In a satellite-supported navigation system, for example the displayed direction indicators have to be updated only when a change is to take place in the direction of travel determined by the navigation system, which is typically necessary only a few times per minute, in the worst case a few times per second. Compared to this, a conventional LCD display must be renewed every 10 ms to 20 ms even if no changes occur in the image to be displayed. In addition, renewal of the image can be limited to the areas in which a change actually occurs in the image to be displayed.

Figure 6:
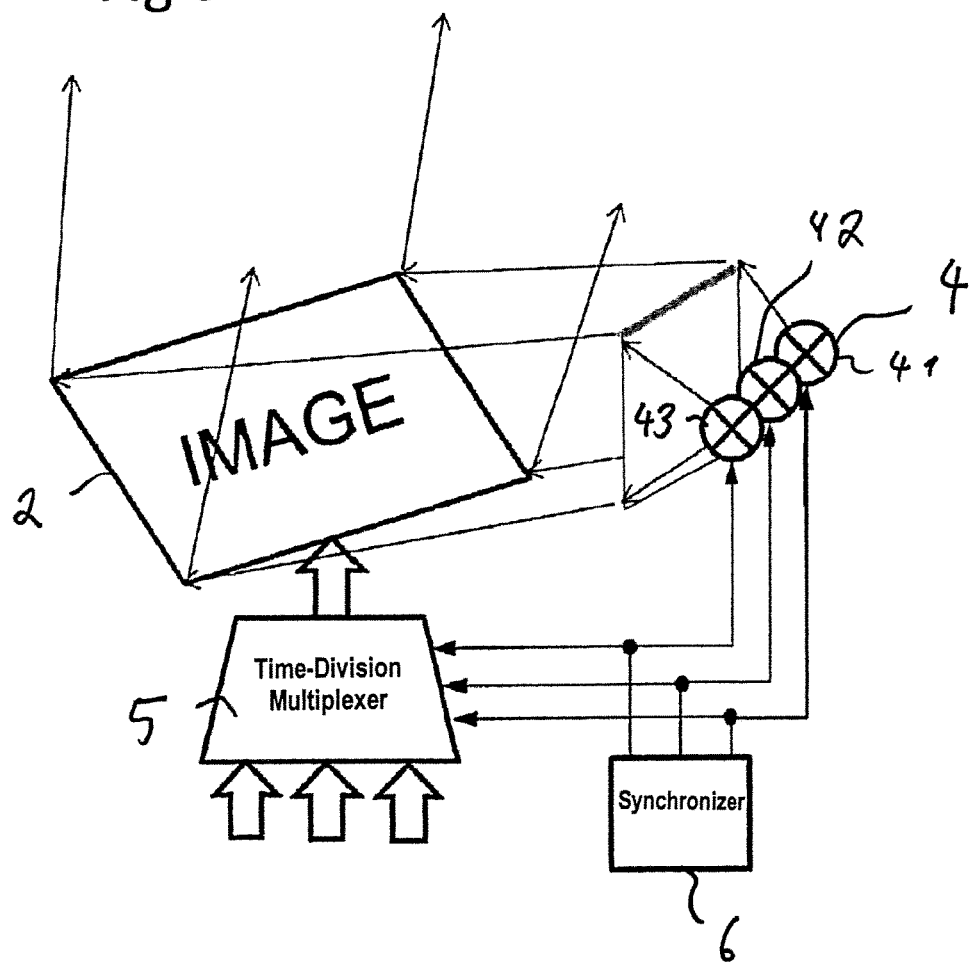

In the exemplary embodiment illustrated in FIG. 6 a full-color image is obtained by virtue of the fact that the lighting source 4 has a light source 41 that emits in the red spectral region, a light source 42 that emits in the green spectral region and a light source 43 that emits in the blue spectral region. The color information is fed to the lighting source 4 in a ratio of 3:1 by a time-division multiplexer 5, wherein the display device is synchronized by a synchronizer 6. One and the same display device 2, which is itself suitable only for monochrome or gray scale display, is therefore illuminated sequentially by red, green and blue color components such that overall an image which appears in full color is produced.

Overall, a head-up display system in which the display device is embodied in accordance with an electronic paper display makes it possible to implement a head-up display that can be manufactured comparatively easily and cost-effectively, can be perceived well by a viewer even in the case of bright surroundings and even with polarized sunglasses, and at the same time is distinguished by reduced consumption of energy. Of course, the head-up display system is also suitable for viewing with other special glasses, for example for passive or active 3D TV or 3D cinema glasses.

In addition, it is conceivable that, for example, in the case of an accident, such a system retains the display of the information which was displayed at the time of the accident.

The invention is not restricted by the description with reference to the exemplary embodiments. Instead, the invention comprises any new feature as well as any combination of features which includes, in particular, any combination of features in the patent claims, even if this feature or this combination itself is not explicitly specified in the patent claims or the exemplary embodiments.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A head-up display system (10) for display on a windowpane (100), comprising:
   an image-generating display device (2) configured to generate an image;
   a lighting source (4) configured to generate radiation to light the image-generating display device (2);
   an optical system (3) configured to deflect the generated image onto the windowpane (100); and
   a time-division multiplexer (5) configured to feed color information to the lighting source (4) in a ratio of 3:1,
   wherein the lighting source includes:
      first, second and third light sources configured to emit light, respectively in the red, green and blue spectral regions, and
      a synchronization unit (6) configured to synchronize the display device (2) to selectively actuate respective ones of the first, second and third light sources for display of a full-color image, and
   wherein the image-generating display device (2) is an electronic paper display device on a flexible substrate, the electronic paper display device including a curved image-generating surface (20) having a curvature, the curvature of the image-generating surface (20) being adjustable, during initialization and during normal operation of the display device (2), by mechanical or electromechanical components configured to adjust the curvature of the image-generating surface (20) so as to compensate for image distortion occurring due to a curvature of the windowpane.

2. The head-up display system as claimed in claim 1, wherein the image-generating display device (2) is configured to, during operation of the head-up display system, reflect the radiation generated by the lighting source (4).

3. The head-up display system as claimed in claim 1, wherein the image-generating display device (2) is configured to, during operation of the head-up display system, transmit the radiation generated by the lighting source (4).

4. The head-up display system as claimed in claim 1, wherein the lighting source (4) is configured to be, during operation of the head-up display system, adjustable with respect to a colorimetric locus.

5. A head-up display (1) comprising:
   the head-up display system (10) as claimed in claim 1; and the windowpane (100) onto which the optical system (3) directs the image of the image-generating display device (2).

\* \* \* \* \*